Aug. 23, 1960    J. G. WIATT ET AL    2,949,708
GAGE HEAD FOR IN-PROCESS GAGING IN MACHINE TOOL
Filed June 24, 1959
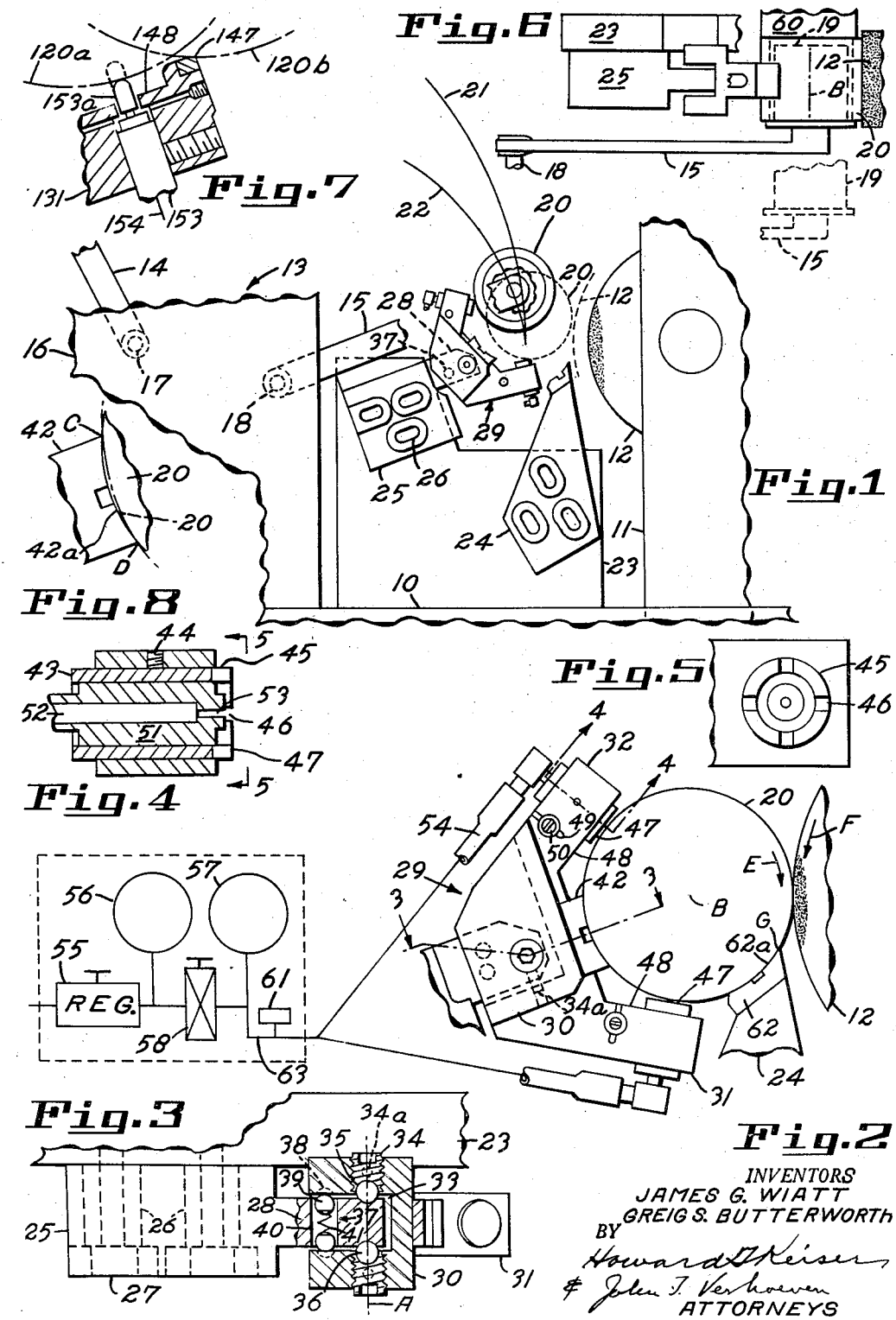
INVENTORS
JAMES G. WIATT
GREIG S. BUTTERWORTH
BY
Howard D. Keiser
& John T. Verhoeven
ATTORNEYS United States Patent Office 2,949,708
Patented Aug. 23, 1960

2,949,708

GAGE HEAD FOR IN-PROCESS GAGING IN MACHINE TOOL

James G. Wiatt, Cincinnati, and Greig S. Butterworth, Columbus, Ohio, assignors to The Cincinnati Milling Machine Co., Cincinnati, Ohio, a corporation of Ohio Filed June 24, 1959, Ser. No. 822,574

11 Claims. (Cl. 51—103)

The present invention relates to a gage head for detecting the change in size of an in-process workpiece in a machine tool.

In any in-process gaging the movement of the surface of the workpiece relative to a sensing element is detected and this movement is converted to a dial reading, or a control signal is given when a predetermined movement has been attained. To the extent the movement of the workpiece surface relative to the sensing element results solely from diminution in size of the workpiece, the dial reading, or the control signal, will be an accurate indication of the size of the workpiece.

However, in any machining operation a force is imparted to the workpiece which can deflect, or shift, the workpiece. For example, in a machine tool where a portion, or portions, of the workpiece are securely held in fixed relation to the machine, as in a center-type grinder where the ends of the workpiece are held in a headstock and tailstock, a force is imparted to the workpiece by the grinding wheel which bends, or deflects, the workpiece. In a microcentric grinding machine where the workpiece, which is supported on shoes, is driven in engagement with the grinding wheel by a magnetic driver, a force can be developed which will deflect the shoes and permit the workpiece to shift bodily. The magnitude of the force varies substantially and depends to a significant extent on the condition of the grinding wheel.

If a single sensing element is fixed relative to the machine, it will detect all movement of the surface of the workpiece during the forming operation. Since the sensing element is incapable of distinguishing between movement of the surface relative to it caused by diminution in size and movement relative to it caused by bodily deflection or shifting, a single fixed sensing element can give a false indication of size. Because the magnitude of the force imparted to the workpiece will depend on varying conditions, it is difficult, in many applications, to provide adequate compensation for its effect. The same difficulty is encountered, although to a lesser extent, if the sensing element is movable relative to the machine, but its movement is restricted so that relative movement between the sensing element and the workpiece as a result of deflection or bodily shifting of the workpiece can take place.

If a pair of fixed sensing elements are utilized, the outputs of which are combined, and they are positioned to span the workpiece so that on shifting of the workpiece in a predetermined direction the workpiece surface moves toward one sensing element the same amount it moves away from the other sensing element, the output of the combined sensing elements will not respond to mere bodily shifting or deflection of the workpiece in that predetermined direction, if the response of the two sensing elements is linear within the range of the deflected movement. However, if the force bodily shifts or deflects the workpiece so that the decrease in the gap at one sensing element is not offset by the increase in the gap at the other sensing element, or if the deflection or shifting of the workpiece causes gap size changes beyond the linear range of the sensing elements, a false reading or signal will be given.

In the present invention a gage head is provided in which all relative movement between the surface of the workpiece and the sensing element is due solely to diminution in size. This is accomplished by pivotally mounting the body of the gage head and providing means on the body establishing locating engagement between the workpiece and the body during the entire operation. The sensing element is not fixed relative to the machine but, instead, is carried by the body in sensing engagement with the workpiece and spaced on the body from the locating means. Thus, if the workpiece deflects, or shifts bodily, under the influence of forces during the operation, the gage head (and the sensing element thereof) freely pivots with the workpiece, and the spacing between the sensing element and the surface of the workpiece is unaffected by such deflection or bodily shifting. However, since the sensing element is spaced from the workpiece locating means, the spacing between the sensing element and the workpiece surface at the sensing element varies as the workpiece diminishes in size, and it is this surface movement, and this surface movement alone, which the gage head of the present invention detects.

It is, therefore, an object of the present invention to provide an improved gage head which detects only movement of the surface of a workpiece resulting from diminution in size. Another object of the present invention is to provide an improved gage head with a sensing element which moves freely with the workpiece as the workpiece is deflected, or shifted bodily, and consequently does not detect or respond to such movement.

In any machine tool it is, of course, important that workpieces be cycled through the machine as rapidly as possible. In order to accomplish this it is necessary to reduce the unproductive loading and unloading time to a minimum and, consequently, the workpiece must be moved quickly into the operating position as soon as the previous workpiece has been operated on, and quickly moved out of said position after the operation to make room for the next workpiece.

Under these circumstances gaging the workpiece during the operation presents a difficult problem. In order to produce accurate gaging the gage head must be positioned precisely relative to the workpiece, and the sensing elements of the gage, which can be easily damaged, must be protected from impact. This problem can be particularly acute in certain grinding operations. In any plunge cut grinding operation as, for example, with a microcentric grinding machine, the span of the surface being ground is less than the width of the grinding wheel and, in order to gage this surface during the operation, the gage head must be located opposite the wheel. It is evident that non-productive time will be consumed if, between operations on successive workpieces, the cutting tool or the gage head must be backed away substantially from the operating position to load a workpiece or if the gage head and the workpiece must be slowly and carefully positioned relative to each other. Under either condition quick cycling of the workpieces through the machine becomes impossible.

In one embodiment of the present invention there is provided a construction in which the gage head in no way impedes or prevents rapid insertion and removal of the workpieces. This is accomplished by providing arms on the gage head body with contact surfaces thereon. The gage head body, which is pivotally mounted, is swingable between a first, or open, position and a second, or gaging, position. At the open position a workpiece moving into the operating position is received in the gage head and contacts one contact surface on the gage head arm, releasing the gage head from said position so that the gage head swings, with the workpiece between the arms thereof, to the gaging position. At this position the workpiece is in its operating position and seats on the locating means of the gage head, thereby locating the sensing means in proper sensing relation to the surface of the workpiece. After the operation on the workpiece is completed, the workpiece is moved away from the operating position, swinging the gage head back to the open position where it is held until the succeeding workpiece is received therein.

It is, therefore, an object of the present invention to provide an improved in-process gage head which does not prevent rapid loading and unloading of the machine tool. It is another object of the invention to provide an improved in-process gage head which does not require retraction, or substantial retraction of the forming tool, for engagement and disengagement of the work. Yet another object is to provide an improved in-process gage which is shiftable by a workpiece moving into and out of the operating position.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

Fig. 1 is an elevational view of the structure of the present invention in a microcentric grinding machine as viewed from the operator's position, showing the gage in an open position to receive a workpiece;

Fig. 2 is an enlarged view of the gage of Fig. 1, but shown in the gaging position, and a schematic representation of the pneumatic circuit therefor;

Fig. 3 is a view taken on the line 3—3 of Fig. 2 but with the workpiece removed;

Fig. 4 is a view taken on the line 4—4 of Fig. 2;

Fig. 5 is a view taken on the line 5—5 of Fig. 4;

Fig. 6 is a top plan view of the gage of Fig. 1 when in the gaging position;

Fig. 7 shows a modified form of the gage of the present invention; and

Fig. 8 is an enlarged view of the shoe of the gage showing in solid lines a finished size workpiece and, in phantom lines, an oversize workpiece, engaged with the shoe.

There is shown in Fig. 1 the slide 10 of a microcentric grinding machine which is mounted on a bed (not shown). The bed also supports a wheelhead 11 in a manner shown in more detail in U.S. Patent 2,795,088 of Schonhoft and Bernhard issued June 11, 1957. The slide 10, after being positioned relative to the wheelhead to accommodate a particular size workpiece, is held stationary while the workpieces are continuously cycled through the machine. The wheelhead is pivotally mounted on the base and during each cycle the grinding wheel 12, which constitutes the forming member of the machine tool, is moved from a retracted position shown in solid lines in Fig. 1 to an operating position in contact with the workpiece, as shown in dotted lines in Fig. 1.

The gage head of the present invention is particularly suitable for use with a rapid loader such as the two arm loader shown and described in the co-pending patent application of Seidel and Steinhard, Serial No. 773,993, now U.S. Patent No. 2,912,798, assigned to the same assignee as the present invention. A loader of this type is shown generally at 13 in Fig. 1 mounted on the slide 10 and having two arms 14 and 15. The arms 14 and 15 are mounted outside the housing 16 on shafts 17 and 18, respectively, which are rotatably mounted in the housing and extend through the far wall thereof, as viewed in Fig. 1. A reversible source of power (not shown) is connected through gear trains to each shaft so that the shafts rotate simultaneously in opposite directions. The arms are mounted on their respective shafts which are spaced from each other, and the arms lie in different planes so they can cross without interference. Each arm has a finger 19 (see Fig. 6) extending from the outer end thereof which is loosely received inside the annular workpiece 20 to carry the same along a path in the plane of the grinding wheel. It will be evident that since the arms travel in different planes the arm 14, which is toward the viewer in Fig. 1 and more remotely spaced from the plane of the grinding wheel than the arm 15, must have a longer finger than the arm 15 since both arms carry the workpieces in the plane of the grinding wheel. The arm 14 carries an unoperated workpiece from its pickup position at a storage station for unoperated workpieces (not shown) to its delivery position at the grinding wheel along a path 21 and simultaneously the arm 15 carries an operated workpiece from its pickup position at the grinding wheel to its delivery position at a storage station for operated workpieces (not shown) along a path 22. The workpieces are disengaged at the delivery positions of the arms by axial shifting of the shafts 17 and 18 in unison away from the plane of the grinding wheel to shift the fingers out of the workpieces (as shown in dotted lines in Fig. 6) and the arms are returned empty to their pickup position where the shafts are shifted axially toward the plane of the grinding wheel for the fingers to again engage workpieces. It will be noted that at the operating, or grinding, position the paths 21 and 22 meet in front of the grinding wheel and are generally parallel to the tangential direction so that no substantial retraction of the grinding wheel is necessary to load and unload workpieces.

At the grinding position a fixed support 23 is mounted on the slide 10. Brackets 24 and 25 have slots 26 extending therethrough in which bolts 27 (see Fig. 3) threadedly engaged with the support 23 are received to adjustably connect the brackets to the support, the bolts being omitted from Fig. 1 for clarity. The bracket 25 has an extending tongue portion 28.

The gage head, shown generally at 29, has a body portion 30 and a pair of arms 31 and 32 extending outwardly therefrom as shown best in Figs. 2 and 3. The body portion 30 has a slot 33 in which the tongue portion 28 of bracket 25 is received. The body portion 30 is pivotally connected to the tongue to swing about an axis A parallel to the longitudinal axis B of the annular cylindrical workpiece 20. On each side of the slot 33 the body portion 30 receives a threaded plug 34, secured by set screws 34a, and terminating in a circular pocket 35 at its inner end. These pockets are aligned with similar pockets in the side surfaces of the tongue 28 and balls 36 are received in the opposed pockets to provide a pivot connection between the body portion of the gage 29 and the bracket 25. A detent 37 is provided to hold the gage in an open position, as shown in Fig. 1. Shallow pockets 38 are provided in the body portion of the gage 30 facing the slot 33. Balls 39 received in a passsage 40 extending through the tongue portion 28 of bracket 25 are urged apart by spring 41 and seat in the pockets 38 when the body portion of the gage is in the open position shown in Fig. 1. Upon application of sufficient force to the lower arm 31 the balls 39 will be urged inwardly and the detent will operate to release the gage from the open position.

The gage head has a shoe 42 connected to the body portion 30 between the arms 31 and 32. As shown in Fig. 8, the shoe 42 has an arcuate surface 42a which contacts the surface of the workpiece at at least two points during the entire grinding operation so that the workpiece is positively located relative to the body portion of the gage and hence is located relative to the outwardly extending arms thereof. When the workpiece 20 is oversize, as indicated by the phantom lines in Fig. 8, the shoe contacts the workpiece along two lines C and D extending normal to the plane of the paper in Fig. 8. The surface 42a of the shoe is formed so that when the workpiece 20 reaches finished size, as shown in solid lines in Fig. 8, the shoe is in mating engagement with the workpiece. Thus the shoe 42 defines locating means on the body portion of the gage by which the workpiece and said body portion are relatively located during the entire grinding operation.

At the outer end of each arm a sleeve 43 is received therein and secured by set screw 44. At one end the sleeve has connected thereto a segmented ring 45 of a wear resistant material, the spaces between the portions of the ring defining gaps 46. The end surface 47 of the ring extends beyond the inboard surface 48 of the arm and defines a contact surface adapted to engage the workpiece during the loading and unloading of the workpiece. However, when a workpiece which is to be ground is received on the shoe 42 and located thereby the contact surfaces of both arms are spaced a small distance from the surface of the workpiece. The arms 31 and 32 are slotted at 49 and a tapered screw 50 is threadedly received in a tapped hole intersected by the slots whereby adjustment of screw 50 permits sensitive adjustment of the position of the outer ends of the arms and the contact surfaces thereof relative to the workpieces which are received therebetween for grinding.

A plug 51 having an air passage 52 therethrough and terminating in an orifice 53 is snugly received within the sleeve, the orifice lying just below or inside the contact surface 47. Air passage 52 is connected by conduit 54 to a conventional pressure gaging circuit. The circuit includes a regulating valve 55 receiving air under pressure from a source (not shown) and passing air at a constant pressure, measured by gage 56, through an adjustable restriction 58 to conduit 63 which connects to conduits 54. The air is discharged through the orifice 53 (and the gaps 46), the workpiece constituting a restriction to the flow of air, which restriction varies as the surface of the workpiece moves relative to the orifice. As the workpiece is ground the surface thereof recedes from the orifice, decreasing the resistance to the flow of air through the orifice and lowering the pressure in line 63. The pressure in conduit 63, measured by gage 57, thereby indicates the position of the surface of the workpiece and consequently the size thereof. The orifice 53 may, for example, in a practical installation be positioned .0005 inch below the surface 47 and the surface 47 may be adjusted by screws 50 to lie .0025 inch from the surface of an unground workpiece. In this form of the invention the orifice 53 constitutes the sensing element and the air stream discharged therefrom establishes sensing engagement with the surface of the workpiece when the workpiece is seated on the shoe 42 during the grinding operation.

A modified form of the present invention, which will give wider range of gaging than is possible with the form previously described, is shown in Fig. 7. In this form, which is similar to the embodiment previously described except as hereafter specifically noted, the sensing element 153 has a depressable feeler 153a normally urged to the position shown in dotted lines in Fig. 7. This sensing element, which may, for example, be similar to the Plunjet air gaging cartridge No. 963 of the Sheffield Corporation of Dayton, Ohio, operates in response to the position of the feeler 153a to variably restrict the flow of air through the passage 154. The contact surface 147 extends above the inboard surface 148 of the arm 131 and is spaced outwardly from the feeler 153a. The feeler extends above the contact surface and contacts the surface of a workpiece, indicated at 120a, when the workpiece is seated on the shoe of the gage, as it is when the gage is in the gaging position. With this construction the feeler will maintain contact with the workpiece even after a substantial amount of stock has been removed therefrom and a wide range of gaging is therefore possible. However, although the feeler extends above the contact surface, it will be noted that the feeler is out of the path of a workpiece, indicated at 120b, which is moving into the operating position when the gage is in the open position, as shown in Fig. 1. In this form of the invention the cartridge 153 constitutes the sensing element and the feeler 153a establishes sensing engagement with the workpiece.

In the continuous cycling of workpieces through the machine an unoperated workpiece is moving toward the operating position along path 21 as the previously operated workpiece leaves the operating position along the path 22. The removal of the previously operated workpiece has swung the gage to the open position shown in Fig. 1 where it is held by detent 37. When the approaching unoperated workpiece reaches the position indicated by dotted lines in Fig. 1 it strikes the contact surface 47 (147) of arm 31 (131), the impact releasing detent 37. Because of the location of the contact surface the sensing element (53 or 153) and any associated element (153a) is protected from impact by the workpiece.

The gage head and the workpiece swing to the position shown in Fig. 2 where the workpiece engages a fixed shoe 62 mounted on bracket 24. The shoe 62 has an arcuate concave surface 62a which, like shoe 42, has a radius equal to the radius of a workpiece of finished size. When an unground workpiece moves into the grinding position it engages shoe 62 along line G only, and engages shoe 42 along lines C and D. The shoe 62 and shoe 42 jointly locate the workpiece at the grinding position and the dual contact of the workpiece with shoe 42 locates the gage head in gaging relation to the workpiece, maintaining the sensing elements thereof in closely spaced sensing relation to the workpiece.

A work drive unit is mounted on the slide 10 and terminates in a rotating magnetic driver 60 which, when energized, drives the workpiece at the grinding position. The workpiece is driven in the direction of arrow E by the driver 60 and is engaged by the grinding wheel which is driven, at a different speed, in the direction of arrow F. In microcentric grinding machines the workpiece is slidably gripped by the magnetic driver and in eccentric relation thereto so that it is continuously urged against the shoes 62 and 42 which jointly locate the workpiece at the grinding position. During the grinding operation the workpiece remains engaged with shoe 62, originally only at G and finally in full mating engagement therewith. Thus, even in the absence of bodily shifting of the workpiece, the central axis thereof will shift as a result of diminution of the workpiece. However, becasue of the locating engagement maintained by shoe 42 between the workpiece and the gage head, the gage head will pivot and the workpiece will remain centered between the sensing elements. The diminution of the workpiece will, in addition, cause displacement of the workpiece surface equally away from the two sensing elements and it is this surface movement which the gage head detects.

In addition to movement of the workpiece surface due to diminution of the workpiece during grinding the workpiece can be expected to shift bodily because of the forces exerted through the workpiece which are capable of deflecting the bracket 24. However, since the shoe 42 is free to pivot it maintains locating engagement with the workpiece despite any shifting thereof and the sensing elements are maintained in proper sensing relation, with the workpiece always centered therebetween. Thus, since the sensing elements are located solely by the workpiece, the workpiece surface can move relative to the sensing elements only as a result of diminution in size and it is this surface movement alone which the sensing elements read.

It will be noted that regardless of the direction of the forces imparted to the workpiece the sensing relation between the workpiece surface and the sensing elements cannot be affected. If bracket 24 should deflect, or even if the gage head body itself should yield under the forces imparted thereto, the workpiece and the sensing elements will be relatively located by the shoe 42. No forces can be imparted to the arms 31 and 32 during the grinding operation and therefore the sensing elements cannot be moved relative to the workpiece. Nor can any deflection of the members supporting the workpiece cause the workpiece bodily to shift closer to the sensing elements. During the entire operation the gaps between the sensing elements and the surface of the workpiece vary solely as the size of the workpiece varies, permitting an accurate sensing of the size of the workpiece.

When the workpiece reaches finished size this fact may be indicated by gage 57 which reads the pressure in line 63. Or, control means such as a pressure operated switch 61, connected to line 63, may be operated when finished size is reached. The control means 61 may give a signal which automatically retracts the grinding wheel or performs some other control function. While the gage head of the present invention would operate in the same manner with only one sensing element, it will be noted that the use of two sensing elements, both connected to line 63, will substantially double the pressure drop in line 63, over that which would occur with only one sensing element, for any given decrease in the size of the workpiece. This permits more precise and positive action of the indicating means 57 or control means 61 when the workpiece has reached finished size.

After the grinding wheel has retracted a small amount the workpiece can be moved along path 22 away from the grinding position. As the workpiece initially moves out of the grinding position the finished surface thereof contacts the contacts surface 47 of arm 32 but, because of the proximity of these surfaces at the grinding position, no damage to the finished surface will result. At the position of the workpiece shown in solid lines in Fig. 1 the workpiece will break contact with the gage head which it has swung to the open position of Fig. 1. The pockets 38 of the gage body are positioned to align with the ball passage 40 of the bracket tongue 28 when the gage is in this open position. The gage will be so held by the detent 37 until the next unoperated workpiece contacts the surface 47 (147) of the lower arm of the gage head.

What is claimed is:

1. In a machine tool having a forming member and means to drive a workpiece in an operating position in contact with the forming member, a gage head having a body portion pivotally mounted adjacent a workpiece in the operating position, means connected to the body portion and adapted to engage a workpiece in said position relatively to locate said body portion and the workpiece, a sensing element carried in fixed relation to the gage head body portion in spaced relation to said locating means and in sensing engagement with the surface of a workpiece engaged with said locating means to detect movement of said workpiece surface relative to said sensing element.

2. In a machine tool having means to drive a workpiece in an operating position, a gage head comprising a body portion pivotally mounted adjacent a workpiece in said operating position, locating means on the body portion to contact a workpiece at at least two points relatively to locate the workpiece and the body portion, an arm extending outwardly from the body portion in spaced relation to the surface of a workpiece in contact with said locating means, and a sensing element on said arm responsive to the relative position of said workpiece surface and said sensing element.

3. In a grinding machine having means to drive a cylindrical workpiece having a longitudinal axis in an operating position, a gage head comprising a body portion pivotally mounted on an axis parallel to the longitudinal axis of the workpiece and adjacent a workpiece in said operating position, a single shoe connected to the body portion having a surface formed to engage a workpiece along at least two spaced lines during the operation on the workpiece to locate the body portion relative to the workpiece, two arms connected to the body portion in straddling relation to the shoe and a workpiece engaged with said shoe, and a sensing element carried on each arm in closely spaced relation to a workpiece engaged with the shoe.

4. In a grinding machine having a rotatable grinding wheel and means to rotate a workpiece in a grinding position in contact with the grinding wheel, in combination: a shoe positioned adjacent the grinding wheel for engagement by a workpiece at the grinding position; a fixed support; a gage head comprising a body portion pivotally mounted on the fixed support, a shoe connected to the body portion having a surface adapted to engage a workpiece at more than one point to locate the workpiece relative to the body portion, an arm extending outwardly from the body portion, and a sensing element on said arm in closely spaced relation to a workpiece engaged with the shoe connected to the body portion and responsive to movement of the surface of said workpiece relative thereto, the shoe adjacent the grinding wheel and the shoe connected to the body portion of the gage head being spaced jointly to support and locate a workpiece in the grinding position.

5. In a machine tool having a forming member and means to drive a workpiece in an operating position in contact with the forming member, a support, a gage head having a pair of extending arms and operable to gage a workpiece received therebetween, said gage head pivotally mounted on said support to swing between a first position with the arms located to receive a workpiece moving toward the operating position and a second position with the arms located in straddling relation to a workpiece in the operating position, and means on the gage head to engage the workpiece when the gage head is in said second position to position said gage head relative to the workpiece.

6. In a machine tool having a forming member and means to drive a workpiece in an operating position in contact with the forming member, a gage head having a pair of extending arms and operable to gage a workpiece received therebetween, said gage head pivotally mounted to swing between a first position with the arms located to receive a workpiece moving toward the operating position and a second position with the arms located in straddling relation to a workpiece in the operating position, said arms having contact surfaces for engagement by the workpiece to swing the gage between said positions.

7. In a machine tool having a forming member and means to drive a workpiece in an operating position in contact with the forming member, a gage head opposite the forming member having a pair of extending arms and having means to sense the size of a workpiece received therebetween, said gage head pivotally mounted to swing between a first position with the arms located to receive a workpiece moving toward the operating position in a path in front of the forming member and a second position with the arms located in straddling relation to a workpiece in the operating position, said arms having contact surfaces near their outer ends for engagement by the workpiece to swing the gage head between said positions, and means on said gage head for relative positioning of the gage head and the workpiece when the workpiece is in the operating position.

8. In a machine tool having a forming member and means to drive a workpiece in an operating position in contact with the forming member, a gage head pivotally mounted opposite the forming member and having a pair of extending arms, each arm having near the outer end thereof a contact surface and means to sense the position of the surface of a workpiece received between the arms, the gage head having a shoe between said extending arms, said gage head having a first position with the arms located to receive a workpiece moving toward the operating position in a path generally tangential to the forming member, one of said contact surfaces being in the path of the workpiece when the gage head is in said first position, said gage head swingable to a second position on engagement of said contact surface by the workpiece, the arms of the gage straddling a workpiece seated on the shoe thereof when the gage is in said second position.

9. In a machine tool having a forming member, means to drive a workpiece in an operating position in contact with the forming member, means to move a workpiece into the operating position along a predetermined path, and means to move an operated workpiece out of the operating position, the combination of a fixed support, a gage head having a body portion pivotally mounted on the fixed support and having a shoe adapted to receive a workpiece, said body portion swingable between a first position where a workpiece moving along said path is spaced from the shoe and a second position where a workpiece at the operating position seats on said shoe, a pair of arms extending outwardly from said body portion having contact surfaces on their inboard faces, one of said contact surfaces engaged by a workpiece moving into the operating position to swing the gage head from the first position to the second position and the other of said contact surfaces engaged by a workpiece moving out of the operating position to swing the gage head from the second position to the first position, and sensing elements on said arms, one of said sensing elements spaced from said one contact surface to lie out of the path of a workpiece moving toward the operating position on initial impact of the workpiece and the contact surface when the body portion of the gage is in the first position, said sensing elements being in sensing engagement with the surface of a workpiece seated on said shoe when the body portion is in the second position.

10. In a machine tool having a forming member and means to drive a workpiece in an operating position in contact with the forming member, a gage head having a body portion pivotally mounted adjacent a workpiece in the operating position, means connected to the body and adapted to engage a workpiece in said position relatively to locate said body portion and the workpiece, a pair of arms carried by the body and spaced to receive a workpiece therebetween, a sensing element mounted on at least one of said arms in sensing engagement with a workpiece engaged with said locating means on the body, each of said arms having a contact surface on the inboard face thereof for engagement, respectively, with a workpiece moving into and out of the grinding position to swing the gage head between an open position and a gaging position.

11. In a machine tool having a grinding wheel and a driver to engage a workpiece in a grinding position in front of the wheel and drive the same in forming engagement with the wheel, the combination of a workpiece carrier operable to move a workpiece into the grinding position along a path terminating in front of the grinding wheel generally parallel to the tangential direction, a gage having a body portion pivotally mounted in front of the grinding wheel and having a pair of arms extending outwardly from the body portion, each arm having near the outer end and on the inboard face thereof a contact surface and a sensing element, a shoe connected on the body portion of the gage having a surface adapted to engage the surface of a workpiece at more than one point to locate the workpiece relative to the body portion of the gage and in centered relation to the sensing elements of the arms, a detent operable to hold the gage head in an open position with the arms positioned to receive therebetween a workpiece moving along said path toward the grinding position, one of said contact surfaces lying in said path of the workpiece when the gage is in said open position, said detent operable on contact of the workpiece with said contact surface to release the gage head from said open position for swinging to a gaging position with the workpiece, a shoe between the gage head and the grinding wheel to receive a workpiece, said shoe and the shoe of the gage head locating the workpiece in the grinding position when the gage is in said gaging position, said shoe of the gage pivoting at the gaging position as the workpiece diminishes in size during grinding, and means to move an operated workpiece out of the grinding position in a direction to engage the other contact surface of the gage and swing the gage back to said open position.

References Cited in the file of this patent

UNITED STATES PATENTS

| | | |
|---|---|---|
| 2,826,012 | Peras | Mar. 11, 1958 |
| 2,838,888 | Cann et al. | June 17, 1958 |
| 2,889,665 | Jessup et al. | June 9, 1959 |
| 2,909,009 | Schmidt et al. | Oct. 20, 1959 |